(12) United States Patent
Levi et al.

(10) Patent No.: US 7,555,487 B2
(45) Date of Patent: Jun. 30, 2009

(54) IMAGE PROCESSING AND IDENTIFICATION SYSTEM, METHOD AND APPARATUS

(75) Inventors: Ronald M. Levi, Calabasas, CA (US); Shai Shprung, Calabasas, CA (US)

(73) Assignee: Xweb, Inc., Carson City, NV (US)

( * ) Notice: Subject to any disclaimer, the term of this patent is extended or adjusted under 35 U.S.C. 154(b) by 235 days.

(21) Appl. No.: 11/207,636

(22) Filed: Aug. 19, 2005

(65) Prior Publication Data
US 2006/0059116 A1    Mar. 16, 2006

Related U.S. Application Data

(60) Provisional application No. 60/603,356, filed on Aug. 20, 2004.

(51) Int. Cl.
*G06F 7/00* (2006.01)
*G06F 17/00* (2006.01)

(52) U.S. Cl. .................. 707/100; 707/6; 707/101; 707/104.1

(58) Field of Classification Search .............. None
See application file for complete search history.

(56) References Cited

U.S. PATENT DOCUMENTS

| | | | |
|---|---|---|---|
| 5,020,112 A * | 5/1991 | Chou ........................ | 382/226 |
| 5,383,754 A * | 1/1995 | Sumida et al. ............... | 412/11 |
| 5,493,621 A * | 2/1996 | Matsumura ................ | 382/125 |
| 5,631,972 A * | 5/1997 | Ferris et al. ................ | 382/125 |
| 5,917,928 A * | 6/1999 | Shpuntov et al. ............ | 382/124 |
| 6,853,389 B1 * | 2/2005 | Ikeda ........................ | 715/790 |
| 6,873,746 B2 * | 3/2005 | Stewart et al. .............. | 382/291 |
| 6,922,781 B1 * | 7/2005 | Shuster ..................... | 713/165 |
| 7,054,461 B2 * | 5/2006 | Zeller et al. ................ | 382/100 |
| 7,079,707 B2 * | 7/2006 | Baron ....................... | 382/289 |
| 7,246,235 B2 * | 7/2007 | Ellison et al. .............. | 713/168 |
| 2004/0165663 A1 * | 8/2004 | Hanami .................. | 375/240.16 |

OTHER PUBLICATIONS

"VisualSEEk: a fully automated content-based image query system", by John R. Smith and Shih-Fu Chang, Department of Electrical Engineering and Center for Image Technology for New Media, Columbia University, ACM Multimedia 96, Boston, MA, Nov. 20, 1996.*

* cited by examiner

*Primary Examiner*—Tim T. Vo
*Assistant Examiner*—Jay A Morrison
(74) *Attorney, Agent, or Firm*—Foley & Lardner LLP

(57) ABSTRACT

Embodiments of the present invention are directed to a system and method for processing and identifying a first data file, the first data file having set of data points, wherein each data point is defined by an x,y coordinate and has a value corresponding to the lightness or darkness of the data resident at the data point, comprising: dividing the first data file into segments; identifying the coordinates of at least one contrast point for each segment; creating a first set of identifiers for the data file, creating a second set of identifiers for a second data file, comparing at least one identifier of the first data file to the corresponding identifier in the second data file; and assessing whether at least a portion of the second data file matches at least a portion of the first data file.

24 Claims, 6 Drawing Sheets

| Image File | tree | women1 |
|---|---|---|
| # of segments | 8 | |
| Subset 1 | 1,4,6 | |
| Subset 2 | 6,7 | |
| Identifier 1 (sum $x_i$, $y_j$ – Seg. 0) | 6 | |
| Identifier 2 (sum $x_i$, $y_j$ – Seg. 1) | 190 | |
| Identifier 3 (sum $x_i$, $y_j$ – Seg. 2) | 225 | |
| Identifier 4 (sum $x_i$, $y_j$ – Seg. 3) | 152 | |
| Identifier 5 (sum $x_i$, $y_j$ – Seg. 4) | 340 | |
| Identifier 6 (sum $x_i$, $y_j$ – Seg. 5) | 365 | |
| Identifier 7 (sum $x_i$, $y_j$ – Seg. 6) | 385 | |
| Identifier 8 (sum $x_i$, $y_j$ – Seg. 7) | 415 | |
| Identifier 9 (orientation of image) | H | |
| Identifier 10 (difference R-B) | 86 | |
| Identifier 11 (non-white value) | 0 | |
| Identifier 12 (sum of x coordinates) | 1128 | |
| Identifier 13 (sum of y coordinates) | 950 | |

FIGURE 6

IMAGE PROCESSING AND IDENTIFICATION SYSTEM, METHOD AND APPARATUS

RELATED APPLICATIONS

This application is related to and claims the benefit of U.S. patent application Ser. No. 60/603,356, entitled Image Processing and Identification System, Method and Apparatus filed on Aug. 20, 2004, and is fully incorporated herein by reference.

FIELD OF THE INVENTION

This invention is directed to a system, method and apparatus for an image processing and identification system and method. More specifically, embodiments are directed to an image processing and identification system and method that utilize identifiers to assess the probability of a match between a known image file and an unknown image.

BACKGROUND OF THE INVENTION

Wide area networks, such as the Internet, have created an avenue for easily transferring and obtaining information, including, for example, articles, news, photographs, and stories. The ease of uploading and downloading information has increased the availability of vast amounts of information to users. Indeed, thousands of web sites have emerged that provide images, photographs, videos and the like, which are made available to users, sometimes without cost.

Although the increase in the availability of information is beneficial, the increased availability of easily accessible information has, however, increased the inappropriate use and transfer of materials belonging to others. More specifically, the availability of information has increased the theft of protected materials, such as copyrighted works, for example, photographs and movies. The theft of photographs and other works have caused a loss of licensing revenue to the property owner, and a loss of control over the property.

To counter the rampant theft, copyright owners have attempted to protect their property by a variety of means. For example, digital watermarks have been included in the images in an attempt to alter the display of the illegal copy of the work. A skilled computer user, however, may be able to remove the digital watermarks, and thus, the image can be transferred or made available without the watermark. Other solutions have included 'locking' the work via a software solution so that an unauthorized user cannot access the work, or including information that distorts or interferes with the display of the work. Still other solutions include inserting a timing mechanism that prevents the display of the work after a predetermined amount to time. Unfortunately, these solutions require that ever copy of the work include the locking mechanism, additional distorting information, or timing mechanism to be effective. Thus, if an unauthorized, unlocked version of a work is distributed, the work, in total, is not protected.

Although the above solutions provide some measures for countering the rampant theft, they do not address the issue of finding the infringing works, and thereby creating an opportunity for the copyright owner to impede the infringer's illicit activity. If the works can be found and identified, recourse by the copyright owner can be initiated. A need in the industry exists for a system and method of creating an identification modality for protected materials such that unknown files can be systematically and automatically reviewed to ascertain whether they are infringing copies of a protected work.

SUMMARY OF THE DISCLOSURE

Embodiments of the present invention are directed to a system and method for processing and identifying a first data file, the first data file having set of data points, wherein each data point is defined by an x,y coordinate and has a value corresponding to the lightness or darkness of the data resident at the data point, comprising: dividing the first data file into segments; identifying the coordinates of at least one contrast data point for each segment; creating a first set of identifiers for the data file, wherein at least one of the identifiers is derived from the data contained in the data file; creating a second set of identifiers for a second data file, wherein at least one of the identifiers is derived from the data contained in the second data file; comparing at least one identifier of the first data file to the corresponding identifier in the second data file; and assessing whether at least a portion of the second data file matches at least a portion of the first data file.

A feature of preferred embodiments is the creation of identifiers for each file. An advantage to this feature is that identifiers for unknown files can be compared to identifiers for known files to determine whether the files are similar without requiring a visual review of each file by an operator.

A further feature of preferred embodiments is the ability to substantially simultaneously compare a plurality of identifiers for known files and unknown files. An advantage to this feature is that multiple known files can be rapidly compared against a plurality of unknown files.

A still further feature of preferred embodiments is the calculation of a checksum for each file. An advantage to this feature is that a comparison of the checksum for a known file and unknown file allows for the elimination of false positives, and thereby minimizes the number of files that require visual review by an operator.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

FIG. 6 is an example of a database of a set of identifiers in a preferred embodiment of the invention.

DETAILED DESCRIPTION OF PREFERRED EMBODIMENTS

Preferred embodiments of the present invention can operate on a stand-alone computer or operate on a network, such as, for example, the Internet, or any other type of network system, including, an internet or an intranet.

Figure 1:
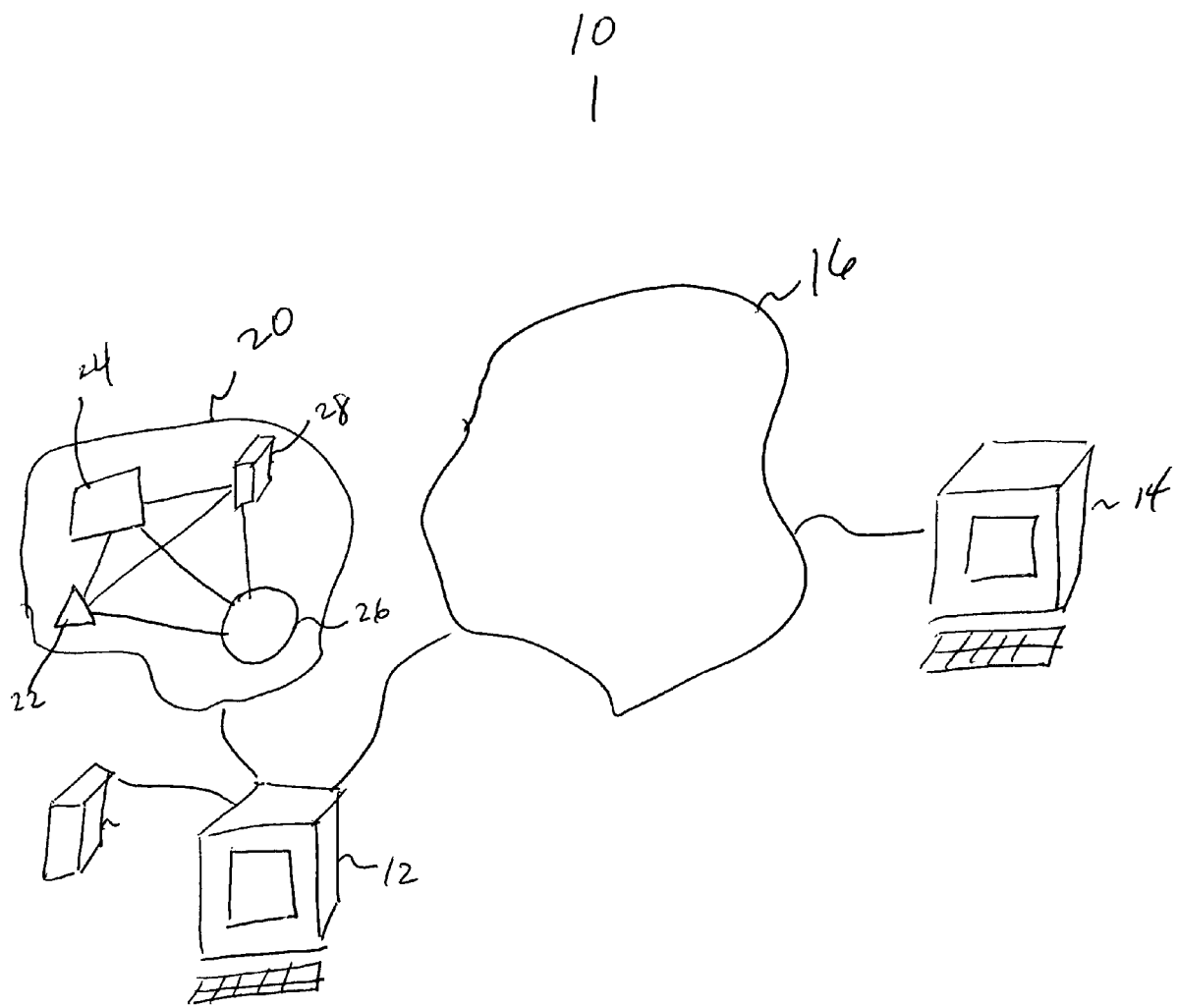
FIG. 1 is a network system environment in accordance with a preferred embodiment of the instant invention.

Hardware Environment:

Preferred embodiments of the present invention operate in accordance with a plurality of networked computers, such as, for example, a user computer and a server computer which are coupled together on a communications network, such as, for example, the Internet or a wide area network. FIG. 1 depicts a network system 10 that operates in accordance with preferred embodiments of the invention. In preferred embodiments, the network system 10 includes a server computer 12, or a provider computer, and a client, or user computer 14, wherein the server computer 12 and the user computer 14 are in electronic communication with each other via a communication link 16. In some preferred embodiments, the network system 10 includes a plurality of either the server computer 12, the user computer 14, or any combination thereof.

The provider computer 12, or server, may comprise any suitable network device configured for communication with other computers and other network devices. The provider computer 12 may comprise, for example, but is not limited to, a personal computer, a mainframe computer, network computer, portable computer, personal digital assistant (such as, a 3Com Palm Pilot), or the like. The provider computer 12 may include one or more internal data storage devices (not shown) for storing content for communication to a user computer 14. Alternatively, or in addition, the provider computer 12 may be coupled to an external data storage device, computer or other means, generally represented at 18. In one embodiment, the external device 18 may comprise a further network device coupled in the network 16.

Each server 12 operates with a persistent storage means, for example, one or more of the fixed and/or removable data storage devices and/or data communications devices connected to the computer. The communication link 16 may include a public network, such as the Internet, a local area network, or any other suitable communications connection, hardwired, wireless, or a hybrid thereof.

The user computer 14 may comprise any suitable network device capable of communicating with other network devices in the network system. In preferred embodiments, the user computer comprises a programmable processor capable of operating in accordance with programs stored on one or more computer readable media (for example, but not limited to floppy disc, hard disc, computer network, random access memory (RAM), CD Rom, or the like), a display device for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device (for example, but not limited to, a keyboard, mouse, microphone, or the like). In one preferred embodiment, the user computer comprises a personal computer system having a CRT display, a keyboard and a mouse user-input device.

The user computer 14 is controlled by suitable software, including network communication and browser software to allow a user to request, receive and display information (or content) from or through a provider computer 12 and other user computers 14 on the network system 10. Some user computers 14 may comprise any suitable network device capable of providing content (data representing text, hypertext, photographs, graphics video and/or audio) for communication over the network. The user computers 14 operate in accordance with programs stored on a readable medium, including, but not limited to, floppy disks, hard disks, RAM and CD-ROM. The user computers 14 are any means capable of communicating with the server computers 12, including, but not limited, to personal computers, kiosks and ATM-type machines. In some embodiments, the user computers 14 can access the server computer 12 via the wide area network or through some other remote access, such as, for example, by telephone, facsimile, personal digital assistant, pulse code system, web TV, or any other device or method that communicates alpha numeric data with a server. In other embodiments, the user computer 14 cannot access the provider computer 12.

GENERAL DESCRIPTION OF PREFERRED EMBODIMENTS

Embodiments of the invention are directed to an image processing and identification system, method and apparatus. Embodiments of the invention are configured to identify unauthorized files, such as images stolen from a web site, or uploaded from a paper photograph or computer image file. Embodiments of the invention can be used for any suitable purpose, such as, to identify photographs of infringements of products covered by design patents, and unauthorized use of trademark logos.

In preferred embodiments, the system operates on a computer network, wherein the image files, both known and unknown, are stored in digital format. An original known image can include, but is not limited to, a photograph that has been digitized and uploaded to the computer, or graphics created via computer, thereby not restricting embodiments of the invention.

With reference again to FIG. 1, the image processing and identification system 20 resides on, or is coupled to a provider computer 12. The image processing and identification system 20 comprises a preprocessor 22, a search engine 24 or spider, and a data processor 26. In some preferred embodiments, the image processing and identification system further comprises a storage device 28. The preprocessor 22 is a software program that is configured to receive a data file and process the information contained in the data file to create a predefined set of identifiers. The data file can be from a known or identified source, or an unknown source. In preferred embodiments, the data file is an image file, such as a jpeg, tiff, png, psd, bmp and pcx file. Further, the contents of the data file can include any type of subject matter, such as a photograph, a trademark logo, an image of a product and the like. Each data file comprises a set of data points or pixels, wherein each data point is represented by an x,y coordinate. Each data point has a value that corresponds to the color, and the lightness or darkness of the data resident at the data point.

The preprocessor 22 establishes at least one identifier, but in most instances, it establishes a plurality of identifiers that are derived from the data contained within the data file. The identifiers create a 'fingerprint' for the file in accordance with a predefined set of rules. In preferred embodiments, the rules are predefined by the operation of the processing system and are established in part because of the nature or subject matter of the image, wherein the rules are established to facilitate the identification of the image in an unknown data file at a later time. More particularly, these identifiers create a set of information that can be used to determine whether an unknown data file is a copy, or partial copy, of the known data file, or a variation on the subject matter contained within the data file.

The search engine 24, or spider, is a computer program configured to search the network of computers and identify data files of a particular type, and their location. The search engine 24 operates in conjunction with the provider server 12 which is configured to communicate with other network devices. It will be understood by those skilled in the art that this process involves communications through suitable servers, routers and other components, as is dictated by the particular network environment. In preferred embodiments, the search engine is configured to identify image data files. Upon identification of the data files and their location, the search engine opens the file and processes the file to create a set of identifiers. In some instances, the file name and location is stored for later retrieval and processing.

The data processor 26 is a software program that is configured to compare the set of identifiers of an unknown image to the sets of identifiers of known images stored in the storage device 18. The data processor determines whether the set of identifiers from the unknown image is sufficiently similar to at least one set of identifiers from the sets of known image files.

Overall, the image processing and identification system operates on a provider computer. The image processing and identification system is configured to receive known files and create a set of predefined codes or identifiers for each known file, wherein the codes or identifiers establish a 'fingerprint' for the file. The predefined identifiers are derived from the original target, or known, files and are used to identify potential infringements or unauthorized uses of the target files, or the subject matter contained within the target file. In one preferred embodiment, at least ten identifiers are created for a file.

The search engine searches the network of computers, for example, user computers 14 and other provider computers 12, such as merchant computers, and identifies all files of a particular type, or having a particular extension. The unknown images are retrieved via the computer network from third party computers, including, but not limited to, individual user computers and servers. These files are analyzed in accordance with the same rules as a target, or known file so as to create a set of identifiers for each unknown file, thereby establishing a 'fingerprint' for the unknown file. If multiple rules for establishing a fingerprint have been utilized on various sets of known files, multiple fingerprints can be created for each unknown file so that the unknown file can be searched for in all sets of known files. Once the fingerprint, or the multiple fingerprints (sets of identifiers) are established, each fingerprint of the unknown files can be compared to the sets of identifiers for the known target files, and thus, a comparison of the files can be initially accomplished without physically reviewing each image file. By comparing the sets of identifiers of the unknown files to the sets of identifiers of the known files, a determination can be made as to whether any of the unknown image files match, or have a high probability of matching the target images. Unknown files can also be directly uploaded to the image processing and identification system from a floppy disk or other storage medium, and thus, the system is not limited to analyzing files identified by the search engine. As discussed above, since many varying target images can exist in the database, each unknown file can be analyzed in accordance with the varying rules for each target file so as to create various sets of identifiers (fingerprints) which can then be compared with the corresponding set of identifiers for the particular target file.

Figure 2:
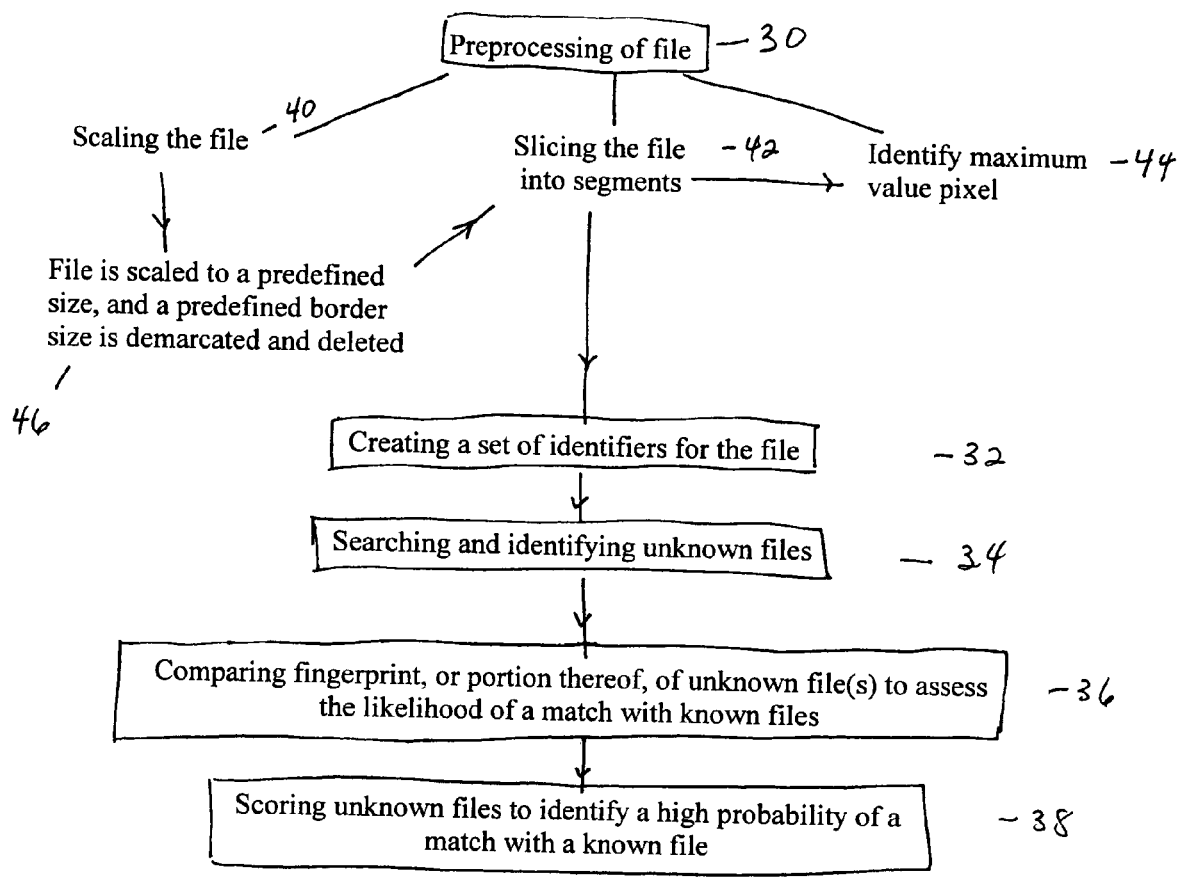
FIG. 2 is a block diagram for processing and identifying image files in one preferred embodiment.

With reference to FIG. 2, in preferred embodiments, the processing and identification of image files comprises preprocessing of a file 30, creating a set of identifiers for the file 32, searching and identifying unknown files 34, comparing the fingerprints, or portions thereof, to assess the likelihood of a match between known files and unknown files 36, and scoring unknown files to identify unknown files having a high probability of matching a known file 38. The preprocessing of an image file comprises scaling the image 40, slicing or dividing the image into segments 42, and identifying, for each segment, the pixel coordinates having the most 'bright' or most 'dark' value 44.

Figure 3:
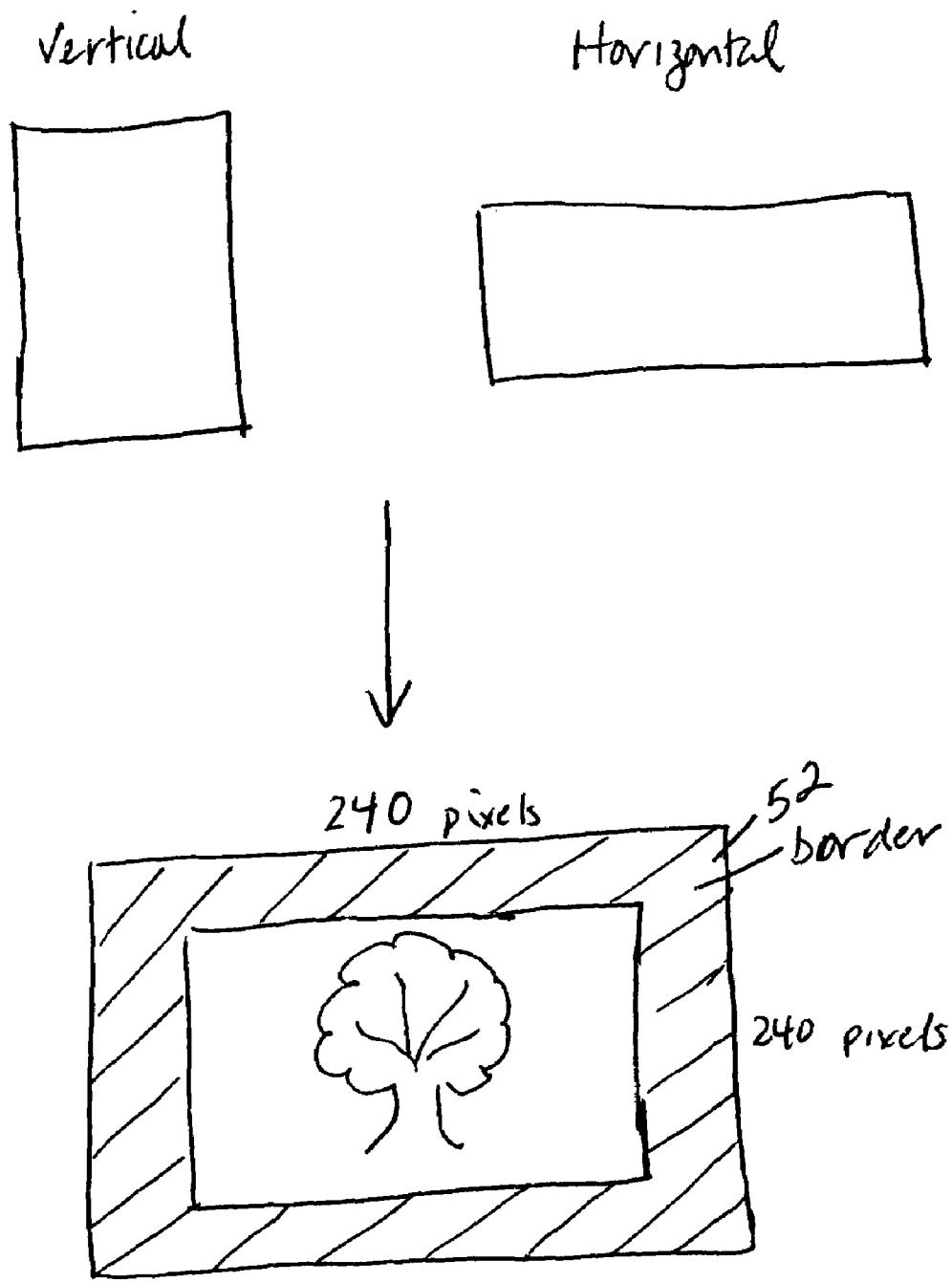
FIG. 3 is a schematic of a scaled image file in accordance with the preferred embodiment of FIG. 2.

With reference to FIG. 3, an original image of interest, a target image 50, is scaled to a predefined size, wherein predefined sections of the original image are ignored. For example, in one preferred embodiment, the image is scaled to 240 pixels by 240 pixels regardless of whether the image is originally square, vertically rectangular, or horizontally rectangular. The scaling of the image eliminates photographic borders, URLs, trademarks, logos and other information that may be included in the border, but would not necessarily be useful in identifying the image of interest.

Figure 4:
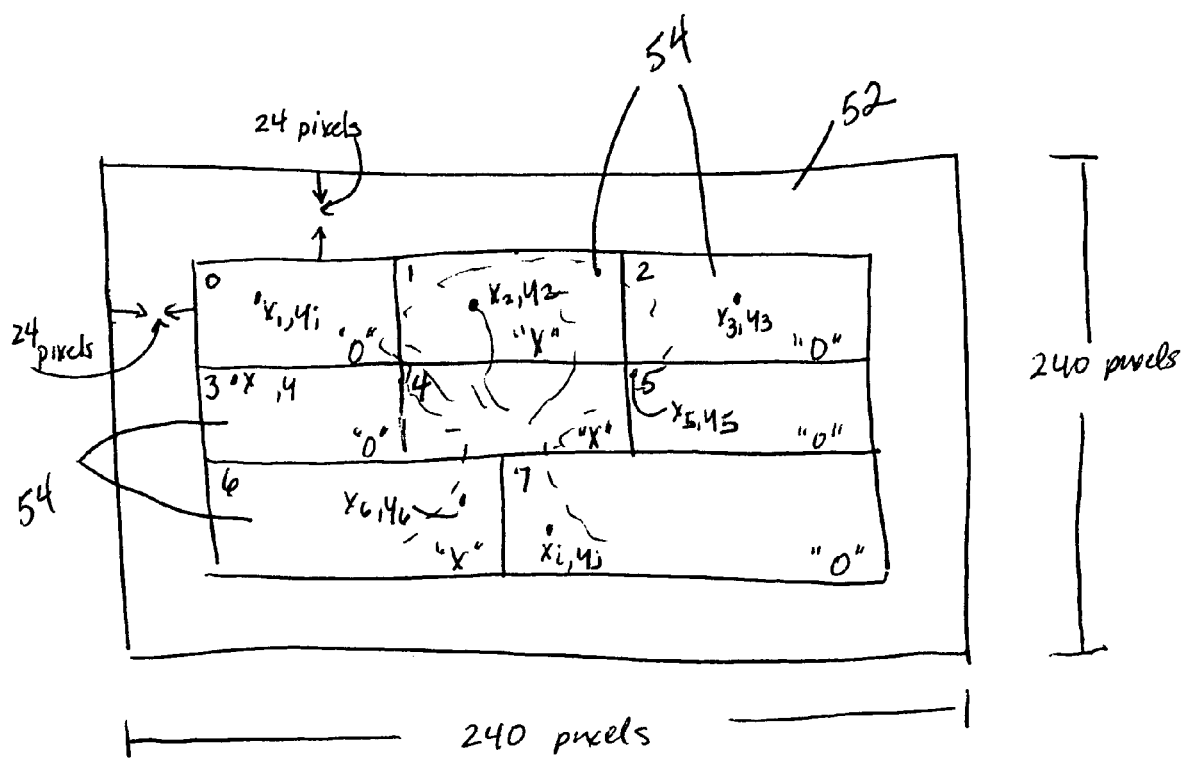
FIG. 4 is a schematic of a segmented image file having identified brightness pixel points and assigned degrees of importance for selected segments.

With reference to FIGS. 2 and 4, once the image is scaled, a border 52 defined by the top, sides and bottom of the image, is demarcated and deleted from the image 46. In preferred embodiments, the size of the border is predefined. In one preferred embodiment, a predefined percentage of the pixels from the original file (known or unknown) are deleted from the top, sides and bottom of the image. For example, for an image size of 240×240 pixels, a width of 24 pixels will be deleted from the top, sides and bottom of the image such that a total of 48 pixels is deleted from the beginning and end of each row and column of pixels, that is, 24 pixels along each side. (See FIG. 4)

After the image is sized, the image is divided or sliced into segments 42. With reference to FIG. 4, each segment 54 is numbered from 0 through n, wherein n+1 is the total number of segments. The number and shape of the segments are determined by the image processing and identification operator, and depends, in part, upon the type of image. For example, if an image contains a large area of grass or other homogenous section, it may be sliced differently than an image without large areas bearing similarity in color or features. The number and shape of the segments can be initially determined by visually reviewing the target image and is intended to assist the operator obtaining data, wherein a minimum number of segments are desirable while providing the maximum ability to identify whether an unknown image is a copy of a target image, or a portion of the target image. Once the number and shape of the segments are determined, each segment is ranked by importance and assigned a scoring value, wherein the scoring value reflects the degree of importance of a segment relative to the image as a whole.

With reference to FIG. 4, segments having high importance are identified, for example, with an "X" and those having low importance are identified with an "0". In preferred embodiments, the segments containing portions of an image or the subject matter of the file are typically designated as having high importance as these sections may provide varying data that assists in the identification of the file. However, various features in the image may be selected as important. For instance, areas of high contrast, for example, a small dark circle, may be of interest in assisting in the identification of the file and thus, the segment containing the dark circle could be designated as having high importance. As discussed below, the scoring values assigned to each of these segments is determined by the importance of the segment.

Once the file is segmented, each segment is scanned and the coordinates $x_i, y_j$ representing the most 'bright' or most 'dark' pixel or point in the segment is identified. (See FIG. 4) As seen from the discussion below, the most 'bright' or most 'dark' point is that point having the greatest contrast relative to the rest of the segment. If the segment is flat, that is, each pixel contained within the segment has the same value, the first pixel point is selected. As is understood by those skilled in the art, the 'color' of each data point is represented by a combination of red, green and blue colors. The levels of red, green and blue can range from 0 to 100 percent, wherein each level is represented by the range of decimal numbers from 0 to 255. The color of each data point or pixel is identified by its RGB value. To determine the most 'bright' or most 'dark' point in a segment, as the segment is scanned, the RGB values for each pixel are calculated. The coordinates of the most 'bright' or most 'dark' point are stored in memory and are replaced only when a pixel having a greater 'brightness' or 'darkness' of a predetermined amount is identified. In one preferred embodiment, the coordinates for the most 'bright' or most 'dark' pixel are only replaced if the 'brightness' or 'darkness' value of subsequently identified pixel exceeds 10% of the currently identified most 'bright' or most 'dark' pixel. This pixel is then identified as the most 'bright' or most 'dark' pixel, until, and if, the RGB value of a later identified pixel exceeds the RGB value by the predefined amount. Regardless of the identity of the most 'bright' or most 'dark' pixel, the running total of the number of 'bright' and 'dark' pixels is maintained while the segment is scanned. Once the entire image is scanned, a determination is made as to the percentage of bright pixels to dark pixels. If a high percentage of dark pixels exist, the pixel identified as the most 'bright' pixel is selected to represent the most unique contrast point for the segment. Similarly, if a high percentage of bright pixels exist, the most 'dark' pixel is selected to represent the most unique contrast point. The identity of the contrast point for each segment is stored in the database and becomes the first eight identifiers in the set for the fingerprint of the image.

Figure 5:
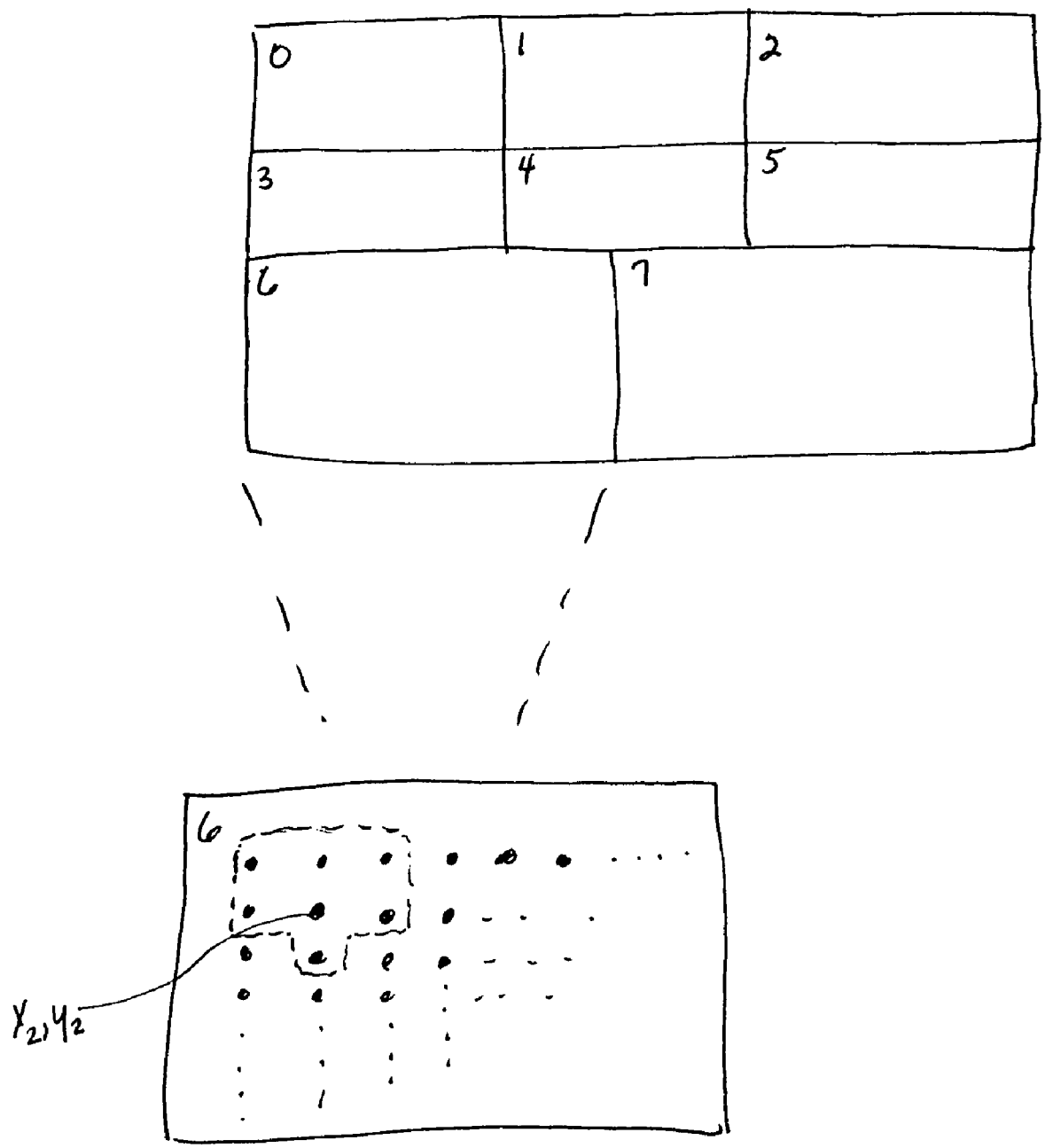
FIG. 5 is a schematic of an "averaging" of pixel values in accordance with the preferred embodiment of FIG. 4.

Due to the compression of images, the original color for a pixel can be lost. When the image is uncompressed, the computer attempts to replace the lost pixel color with a color that may be based on neighboring pixels. If that color is not available, the color is dithered, that is, approximated by the computer. The replacement of the original colors can result in a spreading of colors or 'noise' in the image. To account for this problem, in one embodiment, to determine the most 'bright' or most 'dark' pixel point in a segment, a user defined averaging of pixel colors are calculated. For example, and with reference to FIG. 5, for a defined pixel, $x_2, y_2$ the RGB value of each of six user defined close pixels would be calculated and scanned together. In this embodiment, the sum is divided by a preselected integer which is less than the total number of pixel points used in the sum, for example, six, so as to yield a unique number for later use in comparison. In this regard, it is not a true average, but is rather, designed to accomplish the rendering of a unique integer for later use in comparing the results of similar calculations in unknown images. The manner of averaging can vary and this example is not intended to be limiting, but rather any method for establishing a value for pixel color lost or dithered due to compression, or the computer's inability to accurately provide the color is suitable.

Once the preprocessing of the file is completed, a set of identifiers is created for each image for use in later identification of unknown images. In preferred embodiments, the rules to create the fingerprint, or set of identifiers, is predefined. However, identifiers can be added or removed at the discretion of the operator. Further, due to the nature of some data files, at times, some identifiers cannot be derived, and thus, are ignored for a particular file. In a preferred embodiment, thirteen identifiers are defined and derived for each file (data permitting). The set of identifiers can be created in any order and the following description is not intended to be limiting.

As discussed above, the coordinates identifying the most unique contrast point are used to establish the first eight identifiers. Specifically, the first eight identifiers are defined as the sum of the $x_i, y_j$ coordinates of the unique contrast point previously identified for each segment. Specifically, the value of $x_i$ is added to the value of $y_j$ for the $(x_i, y_j)$ selected for each segment. For example, if $(x_i, y_j)=(2,3)$, the summation of $x_i, y_j$ is $(2+3)=5$. Each sum represents a separate unique identifier for the image and is stored in a database in association with the image and the particular segment. In the preferred embodiment of FIG. 4, eight identifiers are stored for the image; namely, one identifier for segments 0 through 7.

A ninth identifier is defined by the orientation of the image. The original orientation of the image is identified as horizontal (H) or vertical (V), wherein horizontal is defined as any image having more pixels in the horizontal direction than the vertical direction, and vertical is defined as any image having more pixels in the vertical direction than the horizontal direction. If the image is square, it is defined as horizontal. The horizontal or vertical orientation of the original image is stored in the storage device 18 or 22.

A tenth identifier is defined as the numerical difference between the number of red pixels to the number of blue pixels (R-B). To establish the R-B difference, a first subset of the segments is selected (for example, 1, 4, 6), wherein the first subset is selected, in part, by identifying the segments having varying values of brightness and darkness, thereby suggesting definable subject matter in that portion of the image. To determine the difference of red and blue pixel values, the value of red and blue pixel colors is determined for each of the selected segments and combined such that a single value of red is established and a single value of blue is established for the entire subset of segments. For example, segment 1 contains red value of 45 and blue value of 85; segment 4 contains red value of 102 and blue value of 24; and segment 6 contains red value of 98 and blue value of 50. In this example, the R-B value is $(45+102+98)-(85+24+50)=245-159=86$. The pre-identified subset of segments can be changed for each image or group of images. The result of this difference is stored in the storage device 18 or 28 (R−B=± value). The result of this difference is stored in the storage device 18 or 28 (R−B=± value).

The eleventh identifier is defined as the non-bright value of a selected second subset of segments. Similar to the first subset of segments the operator identifies segments having variations in pixel values. In this regard, the variation in pixel values increases the probability that the identifier is fairly unique to this image file, and thereby reduces the incidents of false positives. Using the segments of the first subset defined above, and with reference to FIG. 4, the operator may select segments 1 and 4 for the second subset of segments as a subset of segments 1, 4 and 6 or, for example, could select segments 6 and 7. Once the second subset of segments is identified, the overall non-bright value in each selected segment is 'counted'. To calculate the overall light in each segment, the values of each red pixel are added together, the values of each green pixel are added together, and the values of each blue pixel are added together. The sum of the red, green and blue (RGB) pixel value is then calculated. If the value of the RGB (red, green, blue) is high, the segment is considered light. In some embodiments, if the total value of the red, green and blue is greater than 600, wherein each individual component (red, green or blue) are greater than 130, the segment is considered high. Thus, if the total is greater than 600, but the blue value is less than 130, the segment may not be considered to have a high value. For instance, in some preferred embodiments, individual values above 190 are considered high and values below 65 are considered dark. The total number of non-bright pixels, that is, the sum of the number of non-bright pixels for the selected segments, is stored.

In addition to the summation of the values of $x_i, y_j$ for each segment, the twelfth and thirteenth identifiers are defined by the separate summation of all x coordinates and y coordinates and stored in the database as two additional identifiers. Specifically, $$\sum_{i=0}^{7} x_i = \text{sum of } x \text{ pixels} \quad \sum_{j=0}^{7} y_j = \text{sum of } y \text{ pixels}$$

wherein i,j=identifies the segment for the x,y point. For example, $x_5, y_5$ is the selected x,y point in the segment identified by segment number 5. The sum of the values of $x_i$, i=0 through 7, and the sum of the values of $y_j$, j=0 through 7, are each stored as a separate identifier for the image. For example, $x_0, y_0=1,5$; $x_1, y_1=160, 30$; $x_2, y_2,=200, 25$; $x_3, y_3=2, 150$; $x_4, y_4=175, 165$; $x_5, y_5=215, 150$; $x_6, y_6=180, 205$; and $x_7, y_7=195, 220$, the sum of $x_i=(1+160+200+2+175+215+180+195)=1,128$ and the same of $y_i=(5+30+25+150+165+150+205+220)=950$.

In some embodiments, once all of the identifiers have been established, the original image can be stored as an icon. In some preferred embodiments, the image is stored as 140 pixels in width or in height, and the other dimension is scaled accordingly. The image is thus stored as a thumbnail. In these embodiments, a type of checksum can be performed on the icon image (discussed below) as part of an efficient initial, limited review.

Each of the identifiers is stored in a database in association with the known image file. FIG. 6 illustrates one example of the database. In this embodiment, the identifiers are as follows: 1-8 (sum of $x_i, y_j$ coordinate for each segment); 9 (original orientation of image); 10 (difference between R-B); 11 (sum of non-white values) 12 (sum of all $x_i$ coordinates, i=0 to 7); and 13 (sum of all $y_j$ coordinates, j=0 to 7).

Other identifiers can be established for each image, and the number of identifiers is not restricted or limited to thirteen. Indeed, in some instances, only some of these identifiers can be established. In these instances, only the identifiable identifiers are used to determine the identification of unknown files; however, this does not limit the ability of the system to identify unknown files.

Once the identifiers are established, with reference again to FIG. 2, the system is capable of searching for and identifying unknown files 34. Before the search commences, the operator identifies the type of file that is to be identified, for example, a jpeg file or a tiff file. The type of file can be also be predetermined and stored in the system such that no intervention by an operator is required. The search can be conducted at preset intervals, automatically, and upon operator initiation.

As the system is identifying unknown files, the files are processed so as to ascertain whether any of the files are known files. In some embodiments, the files and their locations are stored for later processing. To identify whether an unknown image matches a particular target file, the steps discussed above are performed on each unknown file in a manner similar to that for the particular target file, and a set of identifiers is created for each unknown file for comparison with the particular target file. To allow a search for multiple target files substantially simultaneously, multiple sets of identifiers can be created for each unknown file corresponding to each of the target files. For example, the slicing of the file and the selection of subsets can differ. In some instances, only one manner of creating a set of identifiers is used. As such, a single set of identifiers for an unknown file can be compared to all of the sets of identifiers in the database for the target files.

Using the set of identifiers created for the unknown image file, a comparison is made between the set of identifiers for the unknown image file, to the sets of identifiers of the target files to determine whether the set of identifiers from the unknown file, or a portion of the set of identifiers, matches any set or portion of a set of identifiers stored in the database for the known files. Based upon the comparison, the system assesses the likelihood of a match between the known files and unknown files 36 (see FIG. 2), discussed below. In one preferred embodiment, the comparison is initially performed by comparing only a portion of the identifiers. In particular, the sum of x identifier and the sum of y identifier, and the horizontal or vertical orientation of the image, are used for the initial review. As this comparison is more limited, it provides for an efficient and relatively rapid review of the database. Once a potential match is identified, the remaining identifiers are used to score the unknown files to identify unknown files having a high probability of a match with a known file.

As the identifiers are compared between the known and unknown image, a score is assigned to each segment of the unknown file, wherein the score is dependent upon the degree of similarity or 'match' between a specific identifier from the known file and the same identifier from the unknown file, and the importance of the particular segment. As discussed above, each segment is assigned a scoring value, wherein the scoring value reflects the degree of importance for the segment. Thus, with respect to an identifier from an unknown file, a match with an identifier in a known image for a segment having a low degree of importance would not be as important as a segment having a high degree of importance, and thus would not receive as high a score. The scoring allows for an expedient evaluation of the unknown files without requiring a visual review of each file.

Reference is made to FIG. 4 wherein the segments marked with an "X" indicate a high degree of importance, and the segments marked with an "O" indicate a low degree of importance. Matches with the "X" segments will be weighted more heavily than matches with the "O" segments. For instance, and as illustrated below, matches with higher importance segments would be assigned a higher match score. In some preferred embodiments, a numerical number is assigned, that is, a score. The following is an example of such scoring:
   i. Area 0: if perfect match—score area is +10 match;
      if close match—score area is +4 match.
   ii. Area 1: if perfect match—score area is +15 match;
      if close match—score area is +6 match; and
      if no match—score area is −3 match.
   iii. Area 2: if perfect match—score area is +10 match;
      if close match—score area is +4 match.
   iv. Area 3: if perfect match—score area is +10 match;
      if close match—score area is +4 match.
   v. Area 4: if perfect match—score area is +15 match;
      if close match—score area is +6 match; and
      if no match—score area is −3 match.

vi. Area 5: if perfect match—score area is +10 match;
  if close match—score area is +4 match.
vii. Area 6: if perfect match—score area is +10 match;
  if close match—score area is +4 match.
viii. Area 7: if perfect match—score area is +10 match;
  if close match—score area is +4 match.

In one embodiment, "close" is defined as value differences between the identifiers of +/−7, and "no match" is defined as a difference in values greater than +/−8. Once the "match" scores for each area has been assigned, all of the match scores are added.

In one preferred embodiment, after the initial comparison using the sum of x and the sum of y, the identifiers 1-8 are used to assess the match of the identification of the x,y point per segment. If the x,y point in a segment is deemed to be a match, the segment is assigned a score. For example, if a perfect match is found for area 0, the segment is scored +10. If the match is "close" the segment is assigned a score of +4. Similarly, if a perfect match is found for area 1, the segment is assigned a score of +15 as area 1 has been weighted more heavily, that is, it is of more interest, than area 0, and a "close" match receives a score of +6. However, for this segment, if there is no match, because of the relevance of the segment, the score is deducted and the segment is assigned a −3 value.

Once the eight x,y (x+y) identifiers have been compared to the eight x,y identifiers (x+y) of the unknown image, the initial score of all of the segments is added. If the score exceeds a predefined amount, the scoring continues. If the score is below the predefined amount, no further scoring is performed and the unknown file is discarded or noted as a non-match. In one preferred embodiment, the predefined score to exceed is +40.

If the score exceeds the predefined amount, an identifier related to another feature of the image is reviewed. For instance, a review of the 'color' of the image can be reviewed. If the known image contains color, the value of the R-B identifier is reviewed. If the known image is black and white, the value of the non-white identifier is compared. Assuming the image contains color, the difference between the values of the R-B identifiers for the known and unknown image is calculated. The difference between the values of the R-B identifiers for the known and unknown image determines the amount of score to be added or subtracted from the existing score for the image. For example, in one embodiment, if the difference is below 15, an additional 22 is added to the score; if the difference is below 30 (but greater than 15), an additional 10 is added to the score; and if the difference is less than 55 (but greater than 30), an additional 5 is added to the score. If the difference is greater than 55, an amount of 25 is deducted from the existing score. Once the scoring is completed for this identifier, the scores are again reviewed. If the score is below 40, the image is considered a non-match. However, any score still remaining greater than 40 is identified as a 'maybe' match. In one embodiment, if the score exceeds 85, the unknown image is determined a 'perfect' match.

Once the system has identified possible matches, to reduce the likelihood of false positives, a visual comparison can be made of the 140 pixel icon to determine whether the icon of the unknown image is proportionally identical to the icon of the known image, namely, that the ratio of x pixels to y pixels is the same for both icons. If the icons are different, the unknown image can be identified as a non-match. If the icon x to y ratios are identical, a checksum can then be performed on the unknown image and compared to the checksum value of the original icon, wherein the check sum is a summation of the number of bright and dark pixels. To identify whether a pixel is bright or dark, in preferred embodiments, if the individual value of the red, green and blue color in each pixel are each greater than 135, and the total sum of the value is greater than 610, the pixel is considered light. If the individual values of the red, green and blue colors are less than 115 and the total sum is less than 150, the pixel is considered 'dark'. The difference between the number of bright and dark pixels for the unknown image is calculated and compared to the difference between the number of bright and dark pixels for and the known image. The difference identifies the brightness of the image, that is, a brightness value. If the difference between the brightness of the known and unknown image is less than a predefined tolerance, the unknown image is opened and visually reviewed. If the difference between the brightness is greater than a predefined tolerance, the unknown image is rejected as a false positive. In one preferred embodiment, if the difference in brightness values for the known and unknown image is less than 18, the image is identified as a perfect match.

Once a match is found, the user can locate the web page on which the unknown image resides and ascertain the owner of that page. In preferred embodiments, the page on which the unknown (infringing) image resides, and other related pages, such as the site entry page, is downloaded and stored. Further, identifying information of the web page owner, for example, name, address, and URL, and the infringing image are stored in a database. A notice of infringement can be automatically transmitted to the owner via any suitable means, including, but not limited to, electronic mail and U.S. mail.

Although the foregoing describes the invention with preferred embodiments, this is not intended to limit the invention. For example, the manner of dividing or slicing data files and scoring each segment can be varied and implemented as is suitable for particular types of data. The foregoing is intended to cover all modifications and alternative constructions falling within the spirit and scope of the invention.

What is claimed is:

1. A method for determining whether first and second data files match, the first and second data files each having a set of data points, wherein each data point is defined by an x,y coordinate and has a characteristic corresponding to the data resident at the data point, comprising:

dividing the first data file that is stored on a data store into plural segments;

selecting at least one data point in each of the plural segments based on a predefined characteristic of the data point;

identifying the coordinates of the at least one selected data point in each segment;

creating a first set of identifiers for the first data file wherein the first set of identifiers includes a respective identifier for each respective segment and that is at least partially determined from the x,y coordinate of at least one selected data point in its associated segment;

associating a respective importance value with each respective segment, the importance value associated with at least one of the segments differing from the importance value associated with at least one other one of the segments;

identifying a second data file;

creating a second set of identifiers for the second data file, the second set of identifiers includes a respective second identifier corresponding to each respective identifier in the first set of identifiers by being at least partially determined from the x,y coordinates of a data point in the second data file that has a characteristic corresponding to the predefined characteristic;

comparing at least one identifier in the first set of identifiers to the corresponding identifier in the second set of identifiers; and assessing whether at least a portion of the second data file matches at least a portion of the first data file, based at least partially on results of the comparing and the importance value associated with each segment for which said at least one identifier in the first set is created.

2. A method as claimed in claim 1, wherein creating a second set of identifiers for the second data file comprises:

dividing the second data file into segments;

selecting at least one data point in each of the plural segments of the second data file based on a characteristic of the data point corresponding to the predefined characteristic for which at least one of the first set of identifiers is selected; and identifying the x,y coordinates of the at least one selected data point for each segment for the second data file.

3. A method as claimed in claim 1, wherein assessing whether at least a portion of the second data files matches at least a portion of the first data file, comprises:

calculating the difference of at least one identifier in the first set of identifiers and the corresponding identifier in the second set of identifiers, wherein the selected identifier is associated with a particular segment; and assigning a scoring value for the segment based at least partially upon the calculated difference and the importance value associated with the segment.

4. A method as claimed in claim 1, wherein creating a first set of identifiers comprises creating a further identifier for the first set of identifiers by:

selecting a subset of segments for the first data file, each selected segment having a number of pixels of a first color and a number of pixels of a second color;

calculating the difference between the number of the pixels of the first color in the selected subset of segments and the number of pixels of the second color in the selected subset of segments.

5. A method as claimed in claim 1, wherein creating a first set of identifiers comprises creating at least one further identifier for the first set of identifiers by:

summing the values of each x coordinate for the selected data points and storing a value that is at least partially defined by that summation in a database; and summing the values of each y coordinate for the selected data points and storing a value that is at least partially defined by that summation in a database.

6. A method as claimed in claim 4, wherein creating a second set of identifiers comprises creating a further identifier for the second set of identifiers by:

dividing the second data file into segments;

selecting a subset of segments for the second data file, each selected segment having a number of pixels of a first color and a number of pixels of a second color; and calculating the difference of the number of pixels of the first color and pixels of the second color in the selected subset of segments;

wherein comparing at least one identifier in the first set of identifiers to the corresponding identifier in the second set of identifiers further comprises comparing he calculated difference of the number of pixels of the first and second colors in the subset of segments selected from the first data file with the difference in the number of pixels of the first and second colors in the subset of segments selected from the second data file.

7. A method as claimed in claim 1, further comprising:

calculating a brightness value for the first data file, wherein the brightness value is the difference between the total number of bright pixels and the total number of dark pixels for a selected subset of segments;

calculating a brightness value for the second data file, wherein the brightness value is the difference between the total number of bright pixels and the total number of dark pixels for the selected subset of segments; and comparing the brightness value of the first data file and the brightness value of the second data file.

8. A method as claimed in claim 7, further comprising: selecting the second data file for visual review if the brightness value for the first data file substantially matches the brightness value for the second data file; and eliminating the second data file as a false positive if the difference between the brightness value for the first data file and the brightness value for the second data file exceeds a predefined tolerance.

9. A method as claimed in claim 8, further comprising:

transmitting notification that the second file is an unauthorized use of the first data file, if the brightness values are within the predefined tolerance.

10. A method as claimed in claim 1, wherein selecting at least one data point comprises selecting a contrast point by;

selecting a segment from the plural segments;

selecting a first data point in the selected segment as the currently identified contrast point and storing a brightness value of the first data point;

comparing the brightness value of the currently identified contrast point to the brightness value of other data points in the segment until the brightness value of one of the other data points in the segment differs from the brightness value of the currently identified contrast point by a predefined amount;

identifying the data point having a brightness value differing from the brightness value of the currently identified contrast point as the new currently identified contrast point; and repeating the steps of comparing the brightness value and identifying the data point having a brightness value differing from the brightness value of the currently identified contrast point as the new currently identified contrast point until all of the remaining data points in the segment have been compared.

11. A method as claimed in claim 1, wherein the first data and second data file have an original orientation, the method further comprising comparing the original orientation of the first data file and the second data file.

12. A method as claimed in claim 10, wherein the value of the data point is calculated by summing the brightness values of the selected data point and data points proximally located to the selected data point and dividing the summation by a predefined integer, wherein the integer is less than the number of data points used in the summation.

13. A method as claimed in claim 1, wherein selecting at least one data point in each of the plural segments based on a predefined characteristic of the data point comprises selecting at least one data point in each of the plural segments based on the brightness of the data resident at the data point.

14. A method as claimed in claim 1, wherein selecting at least one data point in each of the plural segments based on a predefined characteristic of the data point comprises selecting at least one data point in each of the plural segments having a brightness value that results in a visible contrast relative to other portions of the segment from which the data point is selected.

15. A method as claimed in claim 1, wherein selecting at least one data point in each of the plural segments based on a predefined characteristic of the data point comprises selecting at least one contrast data point in each of the plural segments having a brightness value that results in a visible brighter portion relative to other portions of the segment from which the data point is selected.

16. A method as claimed in claim 1, wherein selecting at least one data point in each of the plural segments based on a predefined characteristic of the data point comprises selecting at least one contrast data point in each of the plural segments having a brightness value that results in a visible darker portion relative to other portions of the segment from which the data point is selected.

17. A method as claimed in claim 1, wherein each of the first and second data files comprises a data file for a fixed image and each selected data point comprises a data point in a fixed image.

18. A method as claimed in claim 1, wherein each of the first and second data files comprises a data file for a photograph image and each selected data point comprises a data point in a photograph image.

19. A method as claimed in claim 2, wherein each identifier in the second set of identifiers is at least partially determined from the x,y coordinate of the at least one selected data point in an associated segment.

20. A method as claimed in claim 2, wherein each identifier that is associated with a respective segment of one of the first and second data files is at least partially determined from the summation of the x and y coordinates of at least one selected data point in its associated segment.

21. A method as claimed in claim 4, wherein the pixels of the first color are red pixels and the pixels of the second color are blue pixels.

22. A method as claimed in claim 6, wherein the pixels of the first color are red pixels and the pixels of the second color are blue pixels.

23. A method as claimed in claim 10, wherein the value of the data point is calculated by summing the brightness values of the selected data point and data points proximally located to the selected data point and dividing the summation by the number of data points included in the summation or a predefined integer.

24. A method as claimed in claim 1, wherein;
the data points of each of the first and second data files correspond to data points of an image, the image having an horizontal dimension and a vertical dimension when viewed in a normal orientation, the image extending a number of data points in the horizontal dimension and a number of data points in the vertical dimension, and
creating a first set of identifiers comprises creating a further first identifier in the first set of identifiers for indicating an horizontal orientation in the event that the total number of data points extending in the horizontal dimension of the image corresponding to the first data file is greater than the total number of data points extending in the vertical dimension of that image, and for indicating a vertical orientation in the event that the total number of data points extending in the vertical dimension of the image corresponding to the first data file is greater than the total number of data points extending in the horizontal dimension of that image;
creating a second set of identifiers comprises creating a further second identifier in the second set of identifiers for indicating an horizontal orientation in the event that the total number of data points extending in the horizontal dimension of the image corresponding to the second data file is greater than the total number of data points extending in the vertical dimension of that image, and for indicating a vertical orientation in the event that the total number of data points extending in the vertical dimension of the image corresponding to the second data file is greater than the total number of data points extending in the horizontal dimension of that image; and
comparing comprises comparing the further first identifier with the further second identifier.

* * * * *

UNITED STATES PATENT AND TRADEMARK OFFICE
CERTIFICATE OF CORRECTION

PATENT NO. : 7,555,487 B2  Page 1 of 1
APPLICATION NO. : 11/207636
DATED : June 30, 2009
INVENTOR(S) : Ronald M. Levi and Shai Shprung It is certified that error appears in the above-identified patent and that said Letters Patent is hereby corrected as shown below:

Column 13:
Claim 6, line 62 where the word "he" should read "the".

Signed and Sealed this

Twenty-fourth Day of November, 2009

David J. Kappos
*Director of the United States Patent and Trademark Office*